US010339305B2

(12) United States Patent
Permeh et al.

(10) Patent No.: US 10,339,305 B2
(45) Date of Patent: Jul. 2, 2019

(54) SUB-EXECUTION ENVIRONMENT CONTROLLER

(71) Applicant: Cylance Inc., Irvine, CA (US)

(72) Inventors: Ryan Permeh, Irvine, CA (US); Derek Soeder, Irvine, CA (US); Matthew Wolff, Laguna Niguel, CA (US); Ming Jin, Irvine, CA (US); Xuan Zhao, Irvine, CA (US)

(73) Assignee: Cylance Inc., Irvine, CA (US)

( * ) Notice: Subject to any disclaimer, the term of this patent is extended or adjusted under 35 U.S.C. 154(b) by 205 days.

(21) Appl. No.: 15/441,952

(22) Filed: Feb. 24, 2017

(65) Prior Publication Data

US 2017/0249459 A1    Aug. 31, 2017

Related U.S. Application Data

(60) Provisional application No. 62/300,610, filed on Feb. 26, 2016.

(51) Int. Cl.

| G06F 21/54 | (2013.01) |
| G06N 20/00 | (2019.01) |
| G06F 21/44 | (2013.01) |
| G06F 21/50 | (2013.01) |
| G06F 21/53 | (2013.01) |
| G06F 21/56 | (2013.01) |

(52) U.S. Cl.
CPC .............. *G06F 21/54* (2013.01); *G06F 21/44* (2013.01); *G06F 21/50* (2013.01); *G06F 21/53* (2013.01); *G06F 21/566* (2013.01); *G06N 20/00* (2019.01); *G06F 2221/033* (2013.01)

(58) Field of Classification Search
CPC ....................................................... G06F 21/54
USPC ............................................................. 726/1
See application file for complete search history.

(56) References Cited

U.S. PATENT DOCUMENTS

| 8,950,007 | B1 | 2/2015 | Teal et al. |
| 9,195,823 | B1 | 11/2015 | Binotto et al. |
| 2005/0246683 | A1* | 11/2005 | Usov ..................... G06F 21/121 |
| | | | 717/115 |
| 2008/0059726 | A1* | 3/2008 | Rozas ..................... G06F 21/53 |
| | | | 711/156 |

* cited by examiner

*Primary Examiner* — Jacob Lipman
(74) *Attorney, Agent, or Firm* — Jones Day

(57) ABSTRACT

In one aspect there is provided a method. The method may include: determining that an executable implements a sub-execution environment, the sub-execution environment being configured to receive an input, and the input triggering at least one event at the sub-execution environment; intercepting the event at the sub-execution environment; and applying a security policy to the intercepted event, the applying of the policy comprises blocking the event, when the event is determined to be a prohibited event. Systems and articles of manufacture, including computer program products, are also provided.

42 Claims, 5 Drawing Sheets

SUB-EXECUTION ENVIRONMENT CONTROLLER

RELATED APPLICATION

This application claims priority under 35 U.S.C. § 119(e) to U.S. Provisional Application No. 62/300,610 entitled SUB-EXECUTION ENVIRONMENT INTERCEPTION AND CONTROL and filed on Feb. 26, 2016, the disclosure of which is incorporated herein by reference in its entirety.

TECHNICAL FIELD

The subject matter described herein relates generally to cyber security and more specifically to techniques for controlling execution environments.

BACKGROUND

An operating system typically provides the execution environment in which one or more executables (e.g., computer programs) may run. However, some executables, such as Windows® Script Host, Windows® PowerShell, Java Virtual Machine, Python interpreter, and/or the like, may also provide a sub-execution environment for executing other program code. That is, an executable may receive program code (e.g., text, bytecode) as input and perform the corresponding operations via an internal runtime, interpreter, and/or virtual machine. For instance, Windows® CScript utility (e.g., CScript.exe) may host a sub-execution environment (e.g., an ActiveScript engine) for executing various VisualBasic Script (VBS) files passed to the CScript utility as input. Notably, an otherwise benign executable such as Windows® CScript utility may nevertheless perform malicious operations when provided with input, such as malicious program code, that may cause malicious and/or unwanted behavior. This latent malicious behavior may evade conventional malware detection techniques, which are generally predicated upon an initial determination of the executable as malicious or benign.

SUMMARY

Systems, methods, and articles of manufacture, including computer program products, are provided for sub-execution environment control. In some example embodiments, there is provided a method. The method may include: determining that an executable implements a sub-execution environment, the sub-execution environment being configured to receive an input, and the input being associated with at least one event at the sub-execution environment; intercepting the event at the sub-execution environment; and applying a security policy to the intercepted event, the applying of the policy comprising blocking the event, when the event is determined to be a prohibited event.

In some variations, one or more features disclosed herein including the following features can optionally be included in any feasible combination. The determining that the executable implements the sub-execution environment may be based at least on a file name of the executable, a cryptographic hash of the executable, a program code pattern of the executable, and/or a data pattern of the executable. The executable may be determined to implement the sub-execution environment, when the executable is registered as a handler of a type of file. The event may be the input being accepted at the sub-execution environment. The input accepted by the sub-execution environment may be intercepted by a hook routine configured to detect an attempt by the sub-execution environment to open an existing file. The event may be the input being parsed by the sub-execution environment and/or a corresponding operation being attempted by the sub-execution environment.

In some variations, the event may be determined to comprise the prohibited event. The determining that the event comprises the prohibited event may be based at least on a whitelist of authorized events, the event being determined to comprise the prohibited event when the event does not appear in the whitelist of authorized events. The determining that the event comprises the prohibited event may be based at least on a blacklist of prohibited events, the event being determined to comprise the prohibited event when the event appears in the blacklist of prohibited events. The determining that the event comprises the prohibited event may include processing, with a machine learning model, contextual information associated with the event, the contextual information including the input received at the sub-execution environment, the machine learning model being trained to process the input to at least classify the input as malicious or benign. The machine learning model may include logistic regression, a support vector machine, and/or a neural network.

In some variations, the applying of the security policy may further include allowing the event, when the event is determined to be an authorized event. A loading and/or an activation of the executable in an operating system may be detected. The loading and/or the activation of the executable may be detected based at least on a notification from the operating system. Notifications of when a process launches in the operating system may be registered. Notifications of when a process launches another process in the operating system may be registered.

In some variations, the sub-execution environment may be identified. The event may be intercepted at the sub-execution environment, when the sub-execution environment is identified as a partially trusted sub-execution environment. The sub-execution environment may be virtualized, when the sub-execution environment is identified as an unauthorized sub-execution environment. A process associated with the executable may be terminated, when the sub-execution environment is determined to be an unauthorized sub-execution environment.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
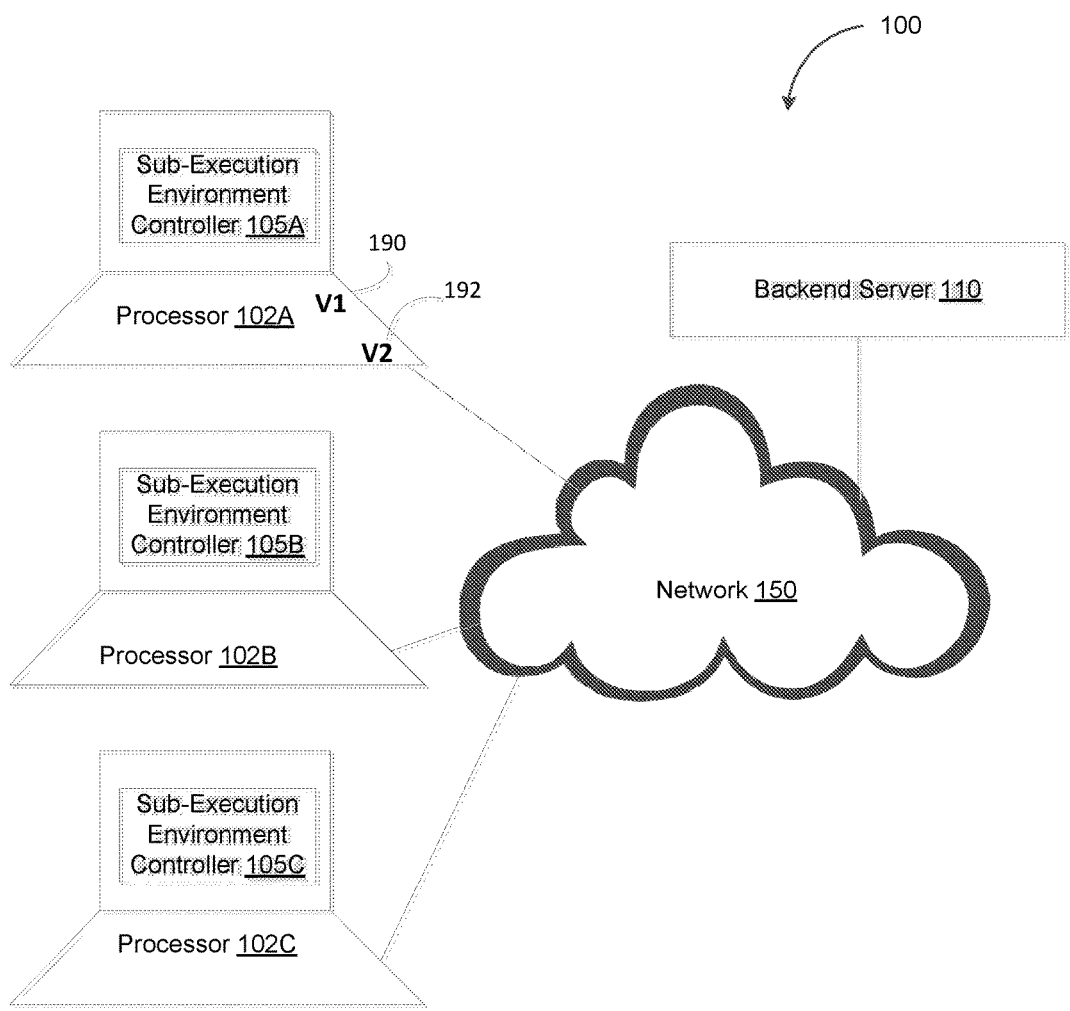
FIG. 1 depicts a network diagram illustrating a network environment, in accordance with some example embodiments.

An executable (e.g., computer program) that implements a sub-execution environment may, as instructed by the program code input to the executable, perform a gamut of arbitrary operations. Thus, while authorized users may use a sub-execution environment (e.g., Windows® Script Host, Windows® PowerShell, Java Virtual Machine, Python interpreter) to perform legitimate actions, the same sub-execution environment may also be exploited by malicious users to perform malicious and/or unwanted actions. As such, in some example embodiments, a sub-execution environment controller may be configured to determine when an executable implements a sub-execution environment. The sub-execution environment controller may be further configured to control the behavior of a sub-execution environment. For example, the sub-execution environment controller may intercept events at the sub-execution environment and perform remediation based at least on the legitimacy of the events.

In some example embodiments, a sub-execution environment controller may detect when executables are being loaded and/or activated, by an operating system, as one or more corresponding processes. As used herein, a process may refer to an instance of an executable being run by an operating system. Here, the sub-execution environment controller may be injected into a new process launching in the operating system. That is, program code for the sub-execution environment controller may be introduced alongside and/or integrated with the program code for the executable, thereby enabling the sub-execution environment controller to be executed along with the new process. For example, the sub-execution environment controller may be injected in response to being notified, by the operating system, of the launch of the new process. Alternately and/or additionally, the sub-execution environment controller may be automatically injected into the new process.

In some example embodiments, a sub-execution environment controller may respond to a loading and/or activation of an executable by at least determining whether that executable implements a sub-execution environment. For example, the sub-execution environment controller may determine whether the executable implements a sub-execution environment based on one or more sub-execution environment identifiers including, for example, a file name of the executable, a cryptographic hash value of the executable, an input format of the executable, a program code pattern of the executable, and/or a data pattern of the executable. Moreover, when the executable is determined to implement a sub-execution environment, the sub-execution environment controller may further determine whether that sub-execution environment is an unauthorized sub-execution environment, a fully trusted sub-execution environment, a partially trusted sub-execution environment, and/or an unknown sub-execution environment.

In some example embodiments, a sub-execution environment controller may intercept one or more events at a sub-execution environment. For instance, the sub-execution environment controller may intercept events at a sub-execution environment that is determined to be a partially trusted sub-execution environment and/or an unknown sub-execution environment. The sub-execution environment controller may intercept events including, for example, inputs accepted by the sub-execution environment, inputs parsed by the sub-execution environment, and/or operations attempted by the sub-execution environment. Furthermore, the sub-execution environment controller may apply one or more policies to determine whether to block at least some of the intercepted events and/or generate an alert corresponding to the intercepted events. For instance, the sub-execution environment controller may validate intercepted events based on a blacklist of prohibited events and/or a whitelist of authorized events. The sub-execution environment controller may further block prohibited events and/or generate alerts that report prohibited events.

FIG. 1 depicts a network diagram illustrating a network environment 100, in accordance with some example embodiments. Referring to FIG. 1, the network environment 100 may include one or more processors 102A-C, such as a computer, a tablet, a mobile device, a smart phone, and/or any other device including at least one processor and at least one memory including program code.

As shown in FIG. 1, each of the processors 102A-C may include a sub-execution environment controller 105A-C. The sub-execution environment controller 105A-C may be configured to determine when an executable implements a sub-execution environment. The sub-execution environment controller 105A-C may be further configured to control the behavior of sub-execution environments running at the respective processors 102A-C. For example, the sub-execution environment controller 105A-C may intercept events at the sub-execution environment and perform remediation based at least on the legitimacy of the events.

To further illustrate, Windows® Script Host, which is typically run as a process named cscript.exe, may instantiate a JScript engine and a VBScript ActiveScript engine. Scripts run in this manner are not subject to any security restrictions and should therefore be monitored, for example, by the sub-execution environment controller 105A-C, due to the relatively high risk of abuse. Meanwhile, Internet Explorer, which is typically run as a process named iexplore.exe, may instantiate the same JScript engine and VBScript ActiveScript engine. However, Internet Explorer runs scripts in a low-privileged environment that poses relatively low risk for abuse. Thus, scripts run in this manner may not require monitoring, for example, by the sub-execution environment controller 105A-C.

In some example embodiments, the processors 102A-C including the sub-execution environment controller 105A-C may be coupled via at least one wired and/or wireless network 150. The network 150 may be the Internet, a public land mobile network, a wireless local area network (WLAN), a wide area network (WAN) a point-to-point link, and/or the like.

Referring again to FIG. 1, the network environment 100 may further include a backend server 110. The backend server 110 may couple to the network 150 to at least enable a downloading of the sub-execution environment controller 105A-C to the corresponding processor 102A-C. Moreover, the backend server 110 may provide updates to the sub-execution environment controller 105A-C. These updates may include updates to a program code and/or metadata (e.g., whitelists of authorized events, blacklists of prohibited events, information for identifying sub-execution environments, and/or the like) of the sub-execution environment controller 105A-C.

Figure 2:
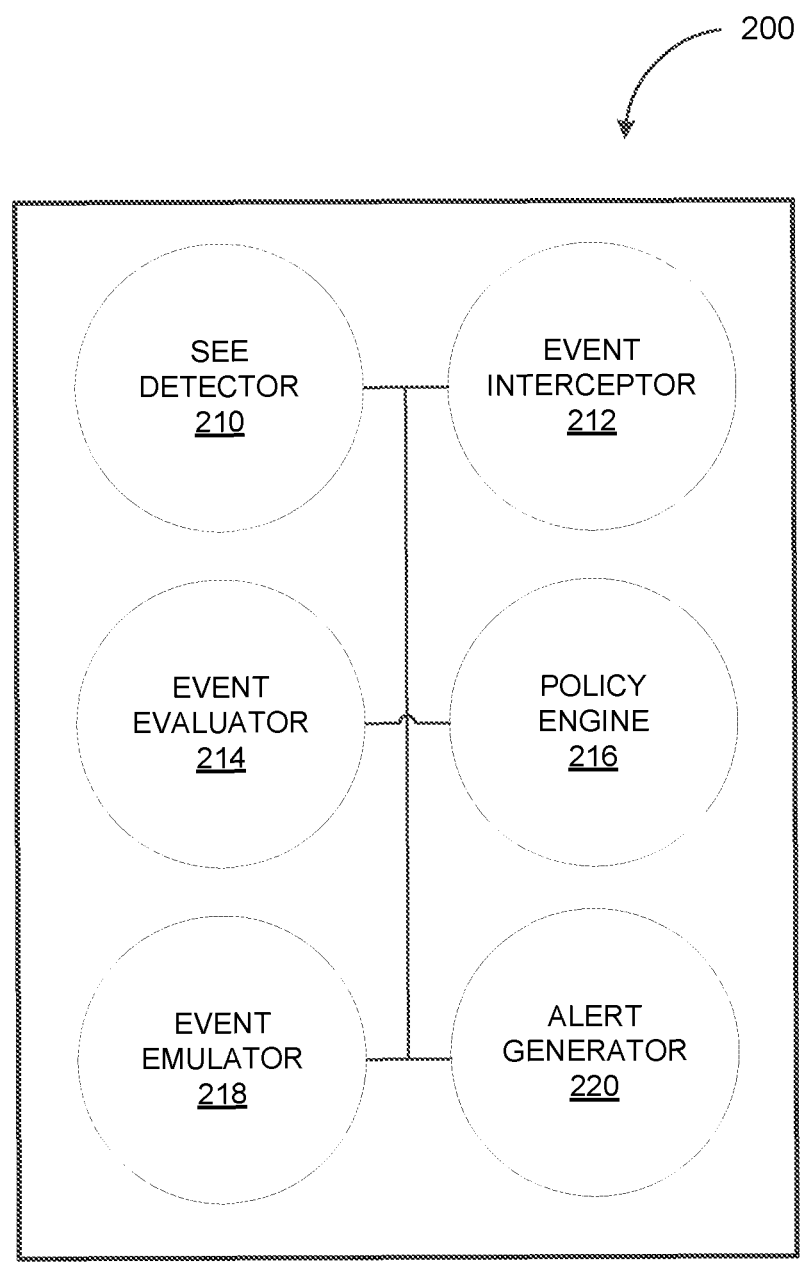
FIG. 2 depicts a block diagram illustrating a sub-execution environment controller, in accordance with some example embodiments.

FIG. 2 depicts a block diagram illustrating a sub-execution environment controller 200, in accordance with some example embodiments. Referring to FIGS. 1-2, the sub-execution environment controller 200 may implement one or more of the sub-execution environment controller 105A-C described with respect to FIG. 1. As shown in FIG. 2, the sub-execution environment controller 200 may include a sub-execution environment (SEE) detector 210, an event interceptor 212, an event evaluator 214, a policy engine 216, a virtualizer 218, and an alert generator 220. It should be appreciated that the sub-execution environment controller 200 may include different and/or additional components than shown.

In some example embodiments, the sub-execution environment detector 210 may be configured to detect when an executable is being loaded and/or activated in an operating system. For example, the sub-execution environment detector 210 may use a kernel driver to register for notifications of when a new process launches in the operating system. Using the kernel driver to register for notifications of new process launches may be suitable for detecting sub-execution environments that are being executed as standalone programs. Alternately and/or additionally, the sub-execution environment detector 210 may insert a hook routine in the Windows® CreateProcess application programming interface (API) function of a running process, thereby allowing the sub-execution environment detector 210 to be notified whenever the hooked process attempts to launch a separate process. The sub-execution environment detector 210 may respond to a notification for the launch of a new process by at least injecting, into the new process, at least a portion of the program code corresponding to the sub-execution environment controller 200 and/or components thereof.

In some example embodiments, the sub-execution environment detector 210 may register the sub-execution environment controller 200 and/or a component thereof in the AppInit_DLLs value of the Windows® registry, thereby allowing at least a portion of the program code for the sub-execution environment controller 200 and/or components thereof to be injected into new processes launching in the operating system. Alternately and/or additionally, the sub-execution environment detector 210 may implement a Windows Application Compatibility shim and/or use the SetWindowsHookEx application programming interface function in order to inject, into new processes launching in the operating system, at least a portion of the program code for the sub-execution environment controller 200 and/or components thereof.

In some example embodiments, the sub-execution environment detector 210 may use a kernel driver to register for notifications of module load events. Using the kernel driver to register for notifications of module load events may be suitable for detecting sub-execution environments that load as a module or a library in a host process. Alternatively and/or additionally, the sub-execution environment detector 210 may detect sub-execution environments that load as a module or a library by at least inserting a hook routine in the LoadLibrary application programming interface function and/or the CoCreateInstance application programing interface function of a host process and/or a potential host process.

In some example embodiments, a sub-execution environment may be loaded as a Microsoft® Component Object Model (COM) object. To detect sub-execution environments that are loaded as a Component Object Model object, the sub-execution environment detector 210 may modify the Windows® registry to replace the sub-execution environment. Alternately and/or additionally, the sub-execution environment detector 210 may insert, into the Windows® registry subsystem, a hook routine and/or callbacks to alter registration of the Component Object Model object as the registration appears to the host program.

In some example embodiments, the sub-execution environment detector 210 may respond to the loading and/or activation of an executable by at least determining whether the executable implements a sub-execution environment. For example, the sub-execution environment 210 may determine whether the executable implements a sub-execution environment based on one or more generic sub-execution environment identifiers such as, for example, a file name of the executable. Here, the file name of the executable may be matched to file names of executables that are known to implement a sub-execution environment. For instance, the sub-execution environment detector 210 may determine, by at least matching the file name cscript.exe to the file names of executables known to implement a sub-execution environment, that the corresponding executable implements a sub-execution environment. It should be appreciated that generic sub-execution environment identifiers (e.g., file names) may be used when there is a low probability that an incorrect determination of whether an executable implements a sub-execution environment can cause undesired and/or anomalous behavior including, for example, degraded performance, false alerts, and program crashes.

Alternately and/or additionally, in some example embodiments, the sub-execution environment detector 210 may determine whether an executable implements a sub-execution environment based on one or more specific sub-execution environment identifiers including, for example, the cryptographic hash value of the executable. Here, the sub-execution environment detector 210 may compare the cryptographic hash value of the executable to the cryptographic hash values of executables known to implement a sub-execution environment. For instance, the sub-execution environment detector 210 may determine that an executable implements a sub-execution environment executable, when the Secure Hash Algorithm 2 (SHA-256) hash value of the executable (e.g., 17f746d82695fa9b35493b41859d39d786-d32b23a9d2e00f4011dec7a02402ae) matches that of an executable that is known to implement a sub-execution environment. It should be appreciated that specific sub-execution environment identifiers (e.g., cryptographic hash values) may be used when there is a high probability that an incorrect determination of whether an executable implements a sub-execution environment can cause undesired behavior and/or anomalous behavior including, for example, degraded performance, false alerts, and program crashes.

Alternately and/or additionally, in some example embodiments, the sub-execution environment detector 210 may determine whether an executable implements a sub-execution environment based on associations the executable has with other files and/or types of files. For instance, the sub-execution environment detector 210 may determine that an executable implements a sub-execution environment, when the executable is configured to open .bat and/or .cmd files. The sub-execution environment detector 210 may determine that an executable implements a sub-execution environment for Xcode files based on the executable being registered as associated with .xcodeproj files. As another example, an executable registered (e.g., in the Windows® registry) as the handler for .py files may provide a sub-execution environment as a Python interpreter.

Alternately and/or additionally, in some example embodiments, the sub-execution environment detector 210 may determine whether an executable implements a sub-execution environment based on program code patterns and/or data patterns exhibited by the executable. For instance, an executable may include a static byte array matching the content of luaP_opmodes. The sub-execution environment detector 210 may follow references from this static byte array to locate program code implementing a LUA interpreter. The sub-execution environment detector 210 may determine that the executable implements a sub-execution environment (e.g., a LUA interpreter), if the sub-execution environment detector 210 is able to locate program code implementing a LUA interpreter.

In some example embodiments, the sub-execution environment detector 210 may identify a sub-execution environment being implemented by an executable. For instance, the sub-execution environment detector 210 may identify a sub-execution environment as unauthorized, trusted, partially trusted, and/or unknown. The type and/or degree of control over the behavior of a sub-execution environment may be determined based at least on the identity of the sub-execution environment as an unauthorized sub-execution environment, a trusted sub-execution environment, a partially trusted sub-execution environment, and/or an unknown sub-execution environment. For example, a trusted sub-execution environment may be allowed to run without any oversight and/or interference from the sub-execution environment controller 200. By contrast, unauthorized, partially trusted, and/or unknown sub-execution environments may be subject to varying levels of oversight and/or interference from the sub-execution environment controller 200.

In some example embodiments, the event interceptor 212 may be configured to intercept one or more events at a sub-execution environment. For instance, the event interceptor 212 may intercept events at a sub-execution environment that is determined (e.g., by the sub-execution environment detector 210) to be a partially trusted and/or unknown sub-execution environment. Events intercepted by the event interceptor 212 may include, for example, inputs accepted by the sub-execution environment, inputs parsed by the sub-execution environment, and/or operations attempted by the sub-execution environment.

In some example embodiments, the event interceptor 212 may intercept inputs accepted by a sub-execution environment by at least inserting, into the CreateFile Windows application programming interface function of the executable, a hook routine configured to detect attempts to open an existing file with read and execute permission. Hooking the CreateFile Windows application programming interface function of the executable may enable the event interceptor 212 to be notified whenever the sub-execution environment attempts to read and execute a file (e.g., a script file) specified by the input. Moreover, the hook routine may check the arguments of the CreateFile call to ensure that the CreateFile call requests both read and execute permissions and that the CreateFile call opens an existing script file instead of creating a new file. The event interceptor 212 may ignore those CreateFile calls that are not related to reading and executing an existing script file. As used herein, a script may refer to a file written in a scripting language (e.g., JavaScript, Python, Perl, Visual Basic for Applications (VBA)) that is capable of being executed without compilation.

Alternately and/or additionally, in some example embodiments, the event interceptor 212 may intercept inputs accepted by a sub-execution environment by inserting, into a main function of the executable, a hook routine configured to inspect the tokenized command line arguments provided to the executable (e.g., the "argv" array). Doing so may enable the event interceptor 212 to inspect tokenized command line arguments before the command line arguments are processed by the sub-execution environment. It should be appreciated that the hook routine to inspect tokenized command line arguments may implement parsing logic specific to each sub-execution environment. As such, the hook routine may parse the command line arguments in a same manner as the sub-execution environment, thereby enabling an identification of the input that will be executed by the sub-execution environment.

In some example embodiments, the event interceptor 212 may intercept inputs that have been parsed by an execution environment by at least utilizing the parsing functionality of the sub-execution environment to parse raw input accepted at the sub-execution environment. For example, the event interceptor 212 may obtain raw command line arguments passed to the sub-execution environment implemented by the executable PowerShell.exe. However, in order to interpret the raw command line arguments correctly, the event interceptor 212 may utilize the parsers associated with the PowerShell.exe sub-execution environment such as, for example, parser classes implemented by Microsoft.PowerShell.ConsoleHost.dll and System.Management.Automation.dll.

In some example embodiments, the event interceptor 212 may intercept operations attempted by the sub-execution environment by at least detecting the occurrences of one or more operations of interest. When an operation of interest occurs, the event interceptor 212 may capture the circumstances of the operation as well as retrieve input triggering the operation and any relevant context of that input. For example, the event interceptor 212 may detect when a sub-execution environment is attempting to run a command by at least inserting, into a CreateProcess application programming interface function of the sub-execution environment, a hook routine configured to retrieve both the command and a file path associated with the command. The hook routine may be configured to retrieve the raw and/or parsed representations of the input accepted by the sub-execution environment. The hook routine may be further configured to retrieve information about the source or origin of the input including, for example, the name of an input file, the zone or universal resource locator (URL) from which the input file was downloaded, and/or the like. Alternately and/or additionally, the hook routine may retrieve a process tree associated with the process hosting the sub-execution environment. This process tree may provide details such as, for example, the user account, creation time, window title and visibility, environment variables, command line of each process, and/or the like. It should be appreciated that at least some information retrieved by the hook routine may be used when evaluating the security policy to apply to the intercepted by the event interceptor 212. This information may further be communicated to a user for inspection and/or may be maintained in an audit log.

In some example embodiments, the event evaluator 214 may be configured to determine a legitimacy of the events intercepted at a sub-execution environment (e.g., by the event interceptor 212) including, for example, inputs accepted at the sub-execution environment, inputs parsed by the sub-execution environment, and/or operations attempted by the sub-execution environment. For example, the event evaluator 214 may evaluate a legitimacy of an event intercepted at a sub-execution environment based on a whitelist that enumerates one or more authorized events. According to some example embodiments, the whitelist may include the cryptographic hashes of authorized sub-execution environments and inputs. Alternately and/or additionally, the whitelist may include files and/or directories that have been designated as trusted. For instance, the whitelist may provide the absolute paths and/or the relative paths of one or more trusted files and/or trusted directories. Alternately and/or additionally, the whitelist may provide regular expressions and/or patterns containing wildcards matching the paths of the one or more trusted files and/or trusted directories. In a default-deny mode of operation, the event evaluator 214 may determine to prohibit any event that is not indicated by the whitelist as an authorized event.

In some example embodiments, the event evaluator 214 may be configured to evaluate a legitimacy of the events intercepted at a sub-execution environment (e.g., by the event interceptor 212) based on a blacklist that enumerates one or more prohibited events. When the event evaluator 214 is operating in a default-allow mode, the event evaluator 214 may determine to prohibit only those events that are indicated by the blacklist as a prohibited event but allow any event that is not included in the blacklist. Here, the blacklist may include the cryptographic hashes of prohibited sub-execution environments and inputs. Alternately and/or additionally, the blacklist may include files and/or directories that have been designated as prohibited.

In some example embodiments, the event evaluator 214 may be configured to utilize machine learning to evaluate a legitimacy of the events intercepted at a sub-execution environment (e.g., by the event interceptor 212). For example, contextual information pertaining to the sub-execution environment and/or the intercepted events (e.g., raw and/or parsed inputs) may be processed with a machine learning based classifier. The machine learning based classifier may be configured to determine a risk associated with the intercepted events. It should be appreciated that any machine learning model may be utilized to evaluate the legitimacy of the events intercepted at a sub-execution environment. For example, a machine learning based classifier may operate on various features from the input including, for example, an ordered sequence of characters or tokens, a set of n-grams, entropy measurements, code complexity measurements, similar features from the file name, and/or the like. The machine learning based classifier may apply one or more machine learning models and/or algorithms including, for example, logistic regression, support vector machine, neural networks, and/or the like.

In some example embodiments, the policy engine 216 may be configured to apply, to an intercepted event, one or more security policies in accordance with a legitimacy of the intercepted event. For instance, the security policies may stipulate that a sub-execution environment should be allowed to perform any authorized event. As such, the policy engine 216 may allow a sub-execution environment to proceed with performing an operation that is determined (e.g., by the event evaluator 214) to be an authorized event. By contrast, the security policies may stipulate blocking of prohibited events. Here, the policy engine 216 may enforce the security policies by blocking an operation determined to be a prohibited event (e.g., by the event evaluator 214) with or without returning an error to the sub-execution environment associated with the prohibited event. Alternately and/or additionally, the security policies may require a termination of the process hosting the sub-execution environment that generated the prohibited event. Thus, the policy engine 216 may terminate any process that attempts to perform an operation that is determined (e.g., by the event evaluator 214) to be a prohibited event.

In some example embodiments, the virtualizer 218 may be configured to virtualize (e.g., through emulation) at least some of the operations attempted by a sub-execution environment that is determined to be an unauthorized sub-execution environment (e.g., by the sub-execution environment detector 210). Alternately and/or additionally, the virtualizer 218 may virtualize (e.g., through emulation) at least some of the prohibited operations attempted by a partially trusted and/or unknown sub-execution environment. For example, the virtualizer 218 may redirect one or more operations to virtualized storage area, thereby preventing these operations from being performed on legitimate files. In doing so, the virtualizer 218 may provide a sandbox in which unauthorized sub-execution environments may run and/or prohibited operations may be performed without corrupting legitimate files. It should be appreciated that the virtualizer 218 may collect a variety of contextual information associated with the running of the unauthorized sub-execution environments and/or the performance of the prohibited operations. This contextual information may be used to at least update the whitelist of authorized events and/or the blacklist of prohibited events. Alternately and/or additionally, this contextual information may be provided to a user in order to, for example, facilitate the investigation of a corresponding security breach and/or attempted security breach, and/or to diagnose and/or remediate a false positive. Moreover, the virtualizer 218 may utilize this contextual information when committing operations that were initially virtualized, in the event that those operations are determined to be legitimate.

In some example embodiments, the alert generator 220 may be configured to generate alerts corresponding to at least some of the events intercepted at a sub-execution environment (e.g., by the event interceptor 212). For example, the alert generator 220 may generate an alert when an intercepted event is determined to be a prohibited event and is therefore blocked (e.g., by the policy engine 216). The alert may include information associated with the intercepted event and/or the corresponding sub-execution environment. This information may include, for example, the input associated with the event, the origin of the event, and/or the like. Alternately and/or additionally, the alert generator 220 may generate an alert when an intercepted event is determined to be an authorized event. It should be appreciated that alerts generated by the alert generator 220 may be provided via one or more user interfaces (e.g., at the processors 102A-C).

Figure 3:
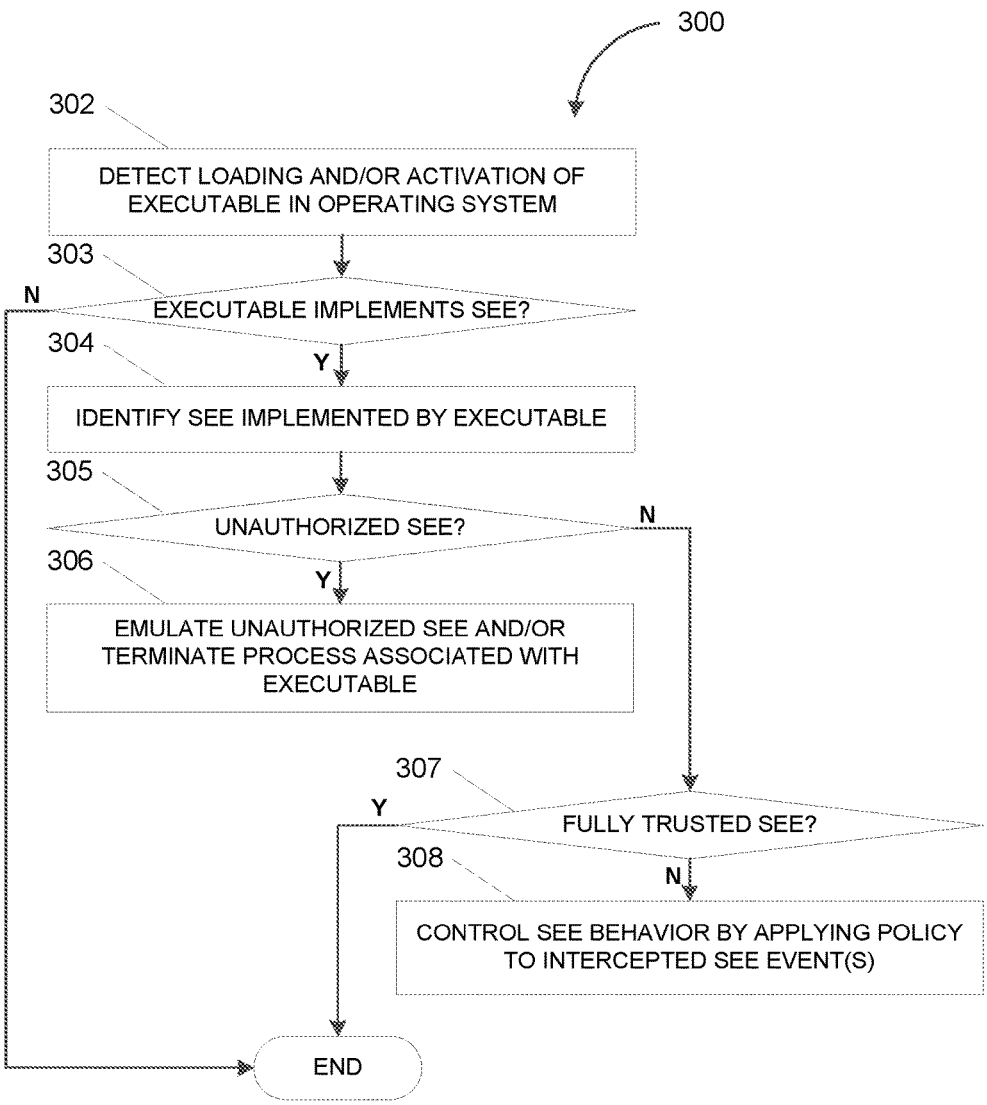
FIG. 3 depicts a flowchart illustrating a process for sub-execution environment control, in accordance with some example embodiments.

FIG. 3 depicts a flowchart illustrating a process 300 for sub-execution environment control, in accordance with some example embodiments. Referring to FIGS. 1-3, the process 300 may be performed by the sub-execution environment controller 200.

The sub-execution environment controller 200 may detect a loading and/or an activation of an executable in an operating system (302). In some example embodiments, the sub-execution environment controller 200 (e.g., the sub-execution environment detector 210) may utilize one or more mechanisms provided by an operating system to detect when an executable is being loaded and/or activated by the operating system. For instance, the sub-execution environment controller 200 may use a kernel driver to register for notifications of when a sub-execution environment is launched as a new process and/or when a sub-execution environment is loaded as a module or a library. Alternately and/or additionally, the sub-execution environment controller 200 may insert hook routines configured to provide notifications whenever a hooked process launches a sub-execution environment as a separate process. The sub-execution environment controller 200 may respond to the launch and/or activation of an executable by at least injecting, into the program code of the executable, at least a portion of the program code associated with the sub-execution environment controller 200 and/or components thereof. However, it should be appreciated that program code associated with the sub-execution environment controller 200 may be injected automatically, for example, by at least registering the sub-execution environment controller 200 in the AppInit_DLLs values of the Windows® registry.

The sub-execution environment controller 200 may determine whether the executable implements a sub-execution environment (303). For example, the sub-execution environment controller 200 (e.g., the sub-execution environment detector 210) may determine whether an executable implements a sub-execution environment based at least on generic sub-execution environment identifiers (e.g., file names) and/or specific sub-execution environment identifiers (e.g., cryptographic hash values). Alternately and/or additionally, the sub-execution environment controller 200 may determine whether an executable implements a sub-execution environment based on associations with other files including, for example, the type of files that the executable is registered to be a handler for. For example, the sub-execution environment controller 200 may determine that an executable provides a sub-execution environment as a Python interpreter based at least on the executable being registered (e.g., in the Windows® registry) as the handler for .py files. Moreover, the sub-execution environment controller 200 may determine whether an executable implements a sub-execution environment based on the program code pattern and/or data pattern present in the executable.

If the sub-execution environment controller 200 determines that the executable does not implement a sub-execution environment (303-N), the process 300 may terminate. For instance, a process that is associated with an executable that does not implement a sub-execution environment may be allowed to run without any oversight and/or interference from the sub-execution environment controller 200. Alternately and/or additionally, if the sub-execution environment controller 200 determines that the executable implements a sub-execution environment (303-Y), the sub-execution environment controller 200 may identify the sub-execution environment being implemented by the executable (304). For example, the sub-execution environment controller 200 (e.g., the sub-execution environment detector 210) may determine whether the executable implements an unauthorized sub-execution environment, a trusted sub-execution environment, a partially trusted sub-execution environment, and/or an unknown sub-execution environment.

The sub-execution environment controller 200 may determine whether the executable implements an unauthorized sub-execution environment (305). If the sub-execution environment controller 200 determines that the executable implements an unauthorized sub-execution environment (305-Y), the sub-execution environment controller 200 may virtualize the unauthorized sub-execution environment and/or terminate a process associated with the executable (306). For example, the sub-execution environment controller 200 (e.g., the virtualizer 218) may provide a sandbox for running an unauthorized sub-execution environment. Here, the sub-execution environment controller 200 may redirect one or more operations attempted by the unauthorized sub-execution environment to virtualized storage area, thereby preventing these operations from being performed on legitimate files. In doing so, the virtualizer 218 may allow the unauthorized sub-execution environments to run without corrupting legitimate files. Alternately and/or additionally, the sub-execution environment controller 200 may terminate a process that is associated with an executable that implements an unauthorized sub-execution environment.

Alternately and/or additionally, the sub-execution environment controller 200 may determine that the executable does not implement an unauthorized sub-execution environment (305-N). As such, the sub-execution environment controller 200 may determine whether the executable implements a fully trusted sub-execution environment (307). In some example embodiments, an executable that implements a trusted sub-execution environment may be allowed to run without any oversight and/or interference from the sub-execution environment controller 200. By contrast, a partially trusted sub-execution environment and/or an unknown sub-execution environment may be subject to varying levels of oversight and/or interference from the sub-execution environment controller 200.

If the sub-execution environment controller 200 determines that the executable implements a fully trusted sub-execution environment (307-Y), the process 300 may terminate. Alternately and/or additionally, if sub-execution environment controller 200 determines that the executable does not implement a fully trusted sub-execution environment (307-N), the sub-execution environment controller 200 may control a behavior of the sub-execution environment by at least applying one or more security policies to events intercepted at the sub-execution environment (308). For example, the sub-execution environment controller 200 (e.g., the event interceptor 212) may intercept events at the sub-execution environment including, for example, inputs accepted at the sub-execution environment, inputs parsed by the sub-execution environment, and/or operations attempted by the sub-execution environment. Furthermore, the sub-execution environment controller 200 (e.g., the event evaluator 214) may determine a legitimacy of the events intercepted at the sub-execution environment. The sub-execution environment controller 200 (e.g., the policy engine 216) may perform remediation based at least on the legitimacy of the intercepted events. For instance, the sub-execution environment controller 200 may apply one or more security policies to determine whether to block and/or allow the intercepted events.

Figure 4:
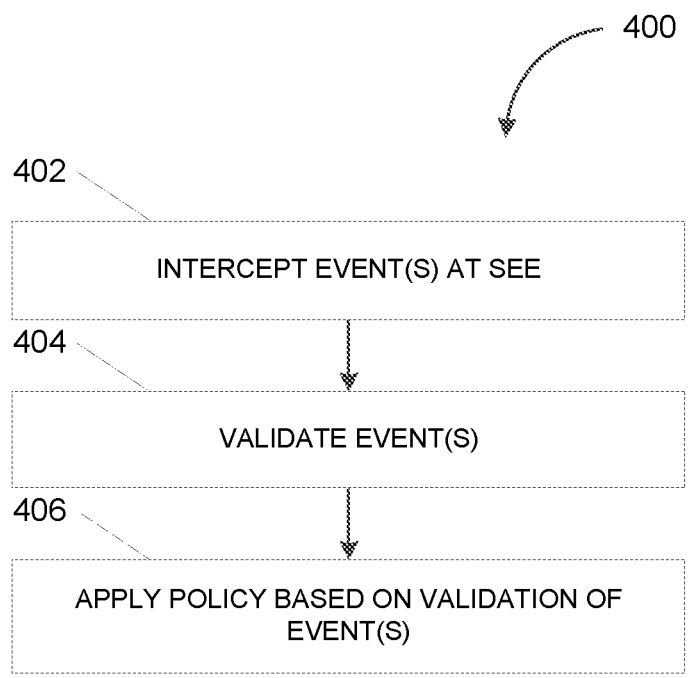
FIG. 4 depicts a flowchart illustrating a process for controlling the behavior of a sub-execution environment, in accordance with some example embodiments.

FIG. 4 depicts a flowchart illustrating a process 400 for controlling the behavior of a sub-execution environment, in accordance with some example embodiments. Referring to FIGS. 1-4, the process 400 may be performed by the sub-execution environment controller 200 and may implement operation 308 of the process 400.

The sub-execution environment controller 200 may intercept one or more events at a sub-execution environment (402). In some example embodiments, the sub-execution environment controller 200 (e.g., the event interceptor 212) may intercept inputs accepted by a sub-execution environment, inputs parsed by the sub-execution environment, and/or operations attempted by the sub-execution environment. For example, the sub-execution environment controller 200 may intercept inputs accepted by a sub-execution environment by at least inserting, into the CreateFile Windows application programming interface function of the executable, a hook routine configured to detect attempts to open an existing file with execute permission. Meanwhile, the sub-execution environment controller 200 may intercept inputs parsed by the sub-execution environment by at least obtaining raw command line arguments passed to the sub-execution environment and utilizing the parsing functionality of the sub-execution environment to parse the raw command line arguments. Alternately and/or additionally, the sub-execution environment controller 200 may intercept operations attempted by the sub-execution environment by at least detecting the occurrences of one or more operations of interest.

The sub-execution environment controller 200 may validate the one or more events (404). For example, the sub-execution environment controller 200 (e.g., the event evaluator 214) may determine a legitimacy of the events intercepted at the sub-execution environment. Here, the sub-execution environment controller 200 may determine the legitimacy of the intercepted events based on a whitelist of authorized events and/or a blacklist of prohibited events. Alternately and/or additionally, the sub-execution environment controller 200 may utilize machine learning to determine the legitimacy of the intercepted events. For instance, information pertaining to the sub-execution environment and/or the intercepted events (e.g., raw and/or parsed inputs) may be processed with a machine learning based classifier including, for example, a recurrent neural network. The machine learning based classifier may be trained to determine a risk associated with the intercepted events.

The sub-execution environment controller 200 may apply security policies based at least on the validation of the one or more events (406). In some example embodiments, the sub-execution environment controller 200 (e.g., the policy engine 216) may apply security policies stipulating that a sub-execution environment should be allowed to perform any authorized event. As such, the sub-execution environment controller 200 may allow a sub-execution environment to proceed with performing an operation that is determined (e.g., by the event evaluator 214) to be an authorized event. Alternately and/or additionally, the sub-execution environment controller 200 may apply security policies stipulating that prohibited events at a sub-execution environment should blocked. Here, the sub-execution environment controller 200 may enforce the security policies by blocking an operation determined to be a prohibited event (e.g., by the event evaluator 214). The operation may be blocked with or without returning an error to the sub-execution environment attempting the operation.

Figure 5:
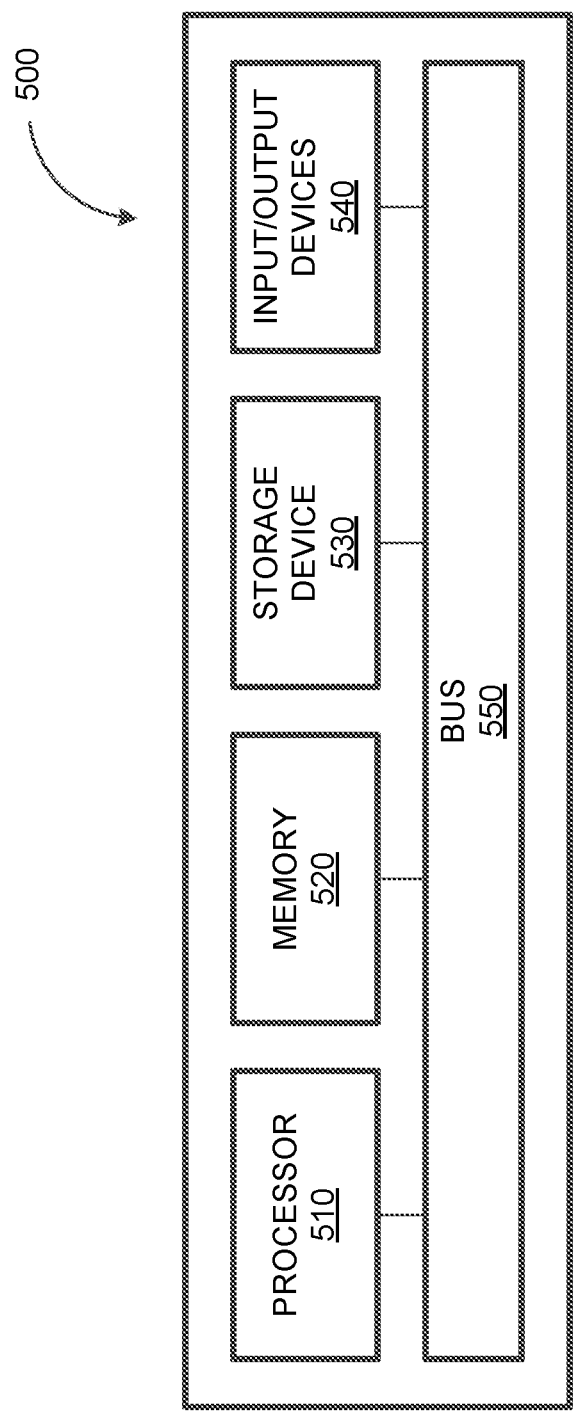
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the processors 102A-C, the sub-execution environment controller 105A-C, the sub-execution environment controller 200, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the sub-execution environment controller 105A-C and/or the sub-execution environment controller 200. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile random-access memory (RAM) that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In some of the example described above, an administrator is described. The administrator may represent a fully and/or or partially automated computer-based process.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few implementations have been described in detail above, other modifications or additions are possible. In particular, further features and/or implementations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claim.

What is claimed:

1. A computer-implemented method, comprising:
   determining that an executable implements a sub-execution environment, the sub-execution environment being configured to receive an input, and the input being associated with at least one event at the sub-execution environment;
   intercepting the event at the sub-execution environment; and
   applying a security policy to the intercepted event, the applying of the policy comprising blocking the event, when the event is determined to be a prohibited event.

2. The computer-implemented method of claim 1, wherein the determining that the executable implements the sub-execution environment is based at least on a file name of the executable, a cryptographic hash of the executable, a program code pattern of the executable, and/or a data pattern of the executable.

3. The computer-implemented method of claim 1, wherein the executable is determined to implement the sub-execution environment, when the executable is registered as a handler of a type of file.

4. The computer-implemented method of claim 1, wherein the event comprises the input being parsed by the sub-execution environment and/or a corresponding operation being attempted by the sub-execution environment.

5. The computer-implemented method of claim 1, wherein the applying of the security policy further comprises allowing the event, when the event is determined to be an authorized event.

6. The computer-implemented method of claim 1, wherein the event comprises the input being accepted at the sub-execution environment.

7. The computer-implemented method of claim 6, wherein the input accepted by the sub-execution environment is intercepted by a hook routine configured to detect an attempt by the sub-execution environment to open an existing file.

8. The computer-implemented method of claim 1, further comprising determining that the event comprises the prohibited event.

9. The computer-implemented method of claim 8, wherein the determining that the event comprises the prohibited event is based at least on a whitelist of authorized events, the event being determined to comprise the prohibited event when the event does not appear in the whitelist of authorized events.

10. The computer-implemented method of claim 8, wherein the determining that the event comprises the prohibited event is based at least on a blacklist of prohibited events, the event being determined to comprise the prohibited event when the event appears in the blacklist of prohibited events.

11. The computer-implemented method of claim 8, wherein the determining that the event comprises the prohibited event includes processing, with a machine learning model, contextual information associated with the event, the contextual information including the input received at the sub-execution environment, the machine learning model being trained to process the input to at least classify the input as malicious or benign.

12. The computer-implemented method of claim 11, wherein the machine learning model comprises logistic regression, a support vector machine, and/or a neural network.

13. The computer-implemented method of claim 1, further comprising detecting a loading and/or an activation of the executable in an operating system.

14. The computer-implemented method of claim 13, wherein the loading and/or the activation of the executable is detected based at least on a notification from the operating system.

15. The computer-implemented method of claim 14, further comprising registering for notifications of when a process launches in the operating system.

16. The computer-implemented method of claim 14, further comprising registering for notifications of when a process launches another process in the operating system.

17. The computer-implemented method of claim 1, further comprising identifying the sub-execution environment.

18. The computer-implemented method of claim 17, wherein the event is intercepted at the sub-execution environment, when the sub-execution environment is identified as a partially trusted sub-execution environment.

19. The computer implemented method of claim 17, further comprising virtualizing the sub-execution environment, when the sub-execution environment is identified as an unauthorized sub-execution environment.

20. The computer-implemented method of claim 17, further comprising terminating a process associated with the executable, when the sub-execution environment is determined to be an unauthorized sub-execution environment.

21. A system, comprising:
    at least one data processor; and
    at least one memory storing instructions which, when executed by the at least one data processor, result in operations comprising:
       determining that an executable implements a sub-execution environment, the sub-execution environment being configured to receive an input, and the input being associated with at least one event at the sub-execution environment;
       intercepting the event at the sub-execution environment; and
       applying a security policy to the intercepted event, the applying of the policy comprising blocking the event, when the event is determined to be a prohibited event.

22. The system of claim 21, wherein the determining that the executable implements the sub-execution environment is based at least on a file name of the executable, a cryptographic hash of the executable, a program code pattern of the executable, and/or a data pattern of the executable.

23. The system of claim 21, wherein the executable is determined to implement the sub-execution environment, when the executable is registered as a handler of a type of file.

24. The system of claim 21, wherein the event comprises the input being parsed by the sub-execution environment and/or a corresponding operation being attempted by the sub-execution environment.

25. The system of claim 21, wherein the applying of the security policy further comprises allowing the event, when the event is determined to be an authorized event.

26. The system of claim 21, wherein the event comprises the input being accepted at the sub-execution environment.

27. The system of claim 26, wherein the input accepted by the sub-execution environment is intercepted by a hook routine configured to detect an attempt by the sub-execution environment to open an existing file.

28. The system of claim 21, further comprising determining that the event comprises the prohibited event.

29. The system of claim 28, wherein the determining that the event comprises the prohibited event is based at least on a whitelist of authorized events, the event being determined to comprise the prohibited event when the event does not appear in the whitelist of authorized events.

30. The system of claim 28, wherein the determining that the event comprises the prohibited event is based at least on a blacklist of prohibited events, the event being determined to comprise the prohibited event when the event appears in the blacklist of prohibited events.

31. The system of claim 28, wherein the determining that the event comprises the prohibited event includes processing, with a machine learning model, contextual information associated with the event, the contextual information including the input received at the sub-execution environment, the machine learning model being trained to process the input to at least classify the input as malicious or benign.

32. The system of claim 31, wherein the machine learning model comprises logistic regression, a support vector machine, and/or a neural network.

33. The system of claim 21, further comprising detecting a loading and/or an activation of the executable in an operating system.

34. The system of claim 33, wherein the loading and/or the activation of the executable is detected based at least on a notification from the operating system.

35. The system of claim 34, further comprising registering for notifications of when a process launches in the operating system.

36. The system of claim 34, further comprising registering for notifications of when a process launches another process in the operating system.

37. The system of claim 21, further comprising identifying the sub-execution environment.

38. The system of claim 37, wherein the event is intercepted at the sub-execution environment, when the sub-execution environment is identified as a partially trusted sub-execution environment.

39. The system of claim 37, further comprising virtualizing the sub-execution environment, when the sub-execution environment is identified as an unauthorized sub-execution environment.

40. The system of claim 37, further comprising terminating a process associated with the executable, when the sub-execution environment is determined to be an unauthorized sub-execution environment.

41. A non-transitory computer-readable storage medium including program code, which when executed by at least one data processor, cause operations comprising:

determining that an executable implements a sub-execution environment, the sub-execution environment being configured to receive an input, and the input being associated with at least one event at the sub-execution environment;

intercepting the event at the sub-execution environment; and applying a security policy to the intercepted event, the applying of the policy comprising blocking the event, when the event is determined to be a prohibited event.

42. An apparatus, comprising:

means for determining that an executable implements a sub-execution environment, the sub-execution environment being configured to receive an input, and the input being associated with at least one event at the sub-execution environment;

means for intercepting the event at the sub-execution environment; and means for applying a security policy to the intercepted event, the applying of the policy comprising blocking the event, when the event is determined to be a prohibited event.

* * * * *